May 19, 1931.  R. S. OHL  1,805,591
SIGNALING SYSTEM
Filed Dec. 18, 1926
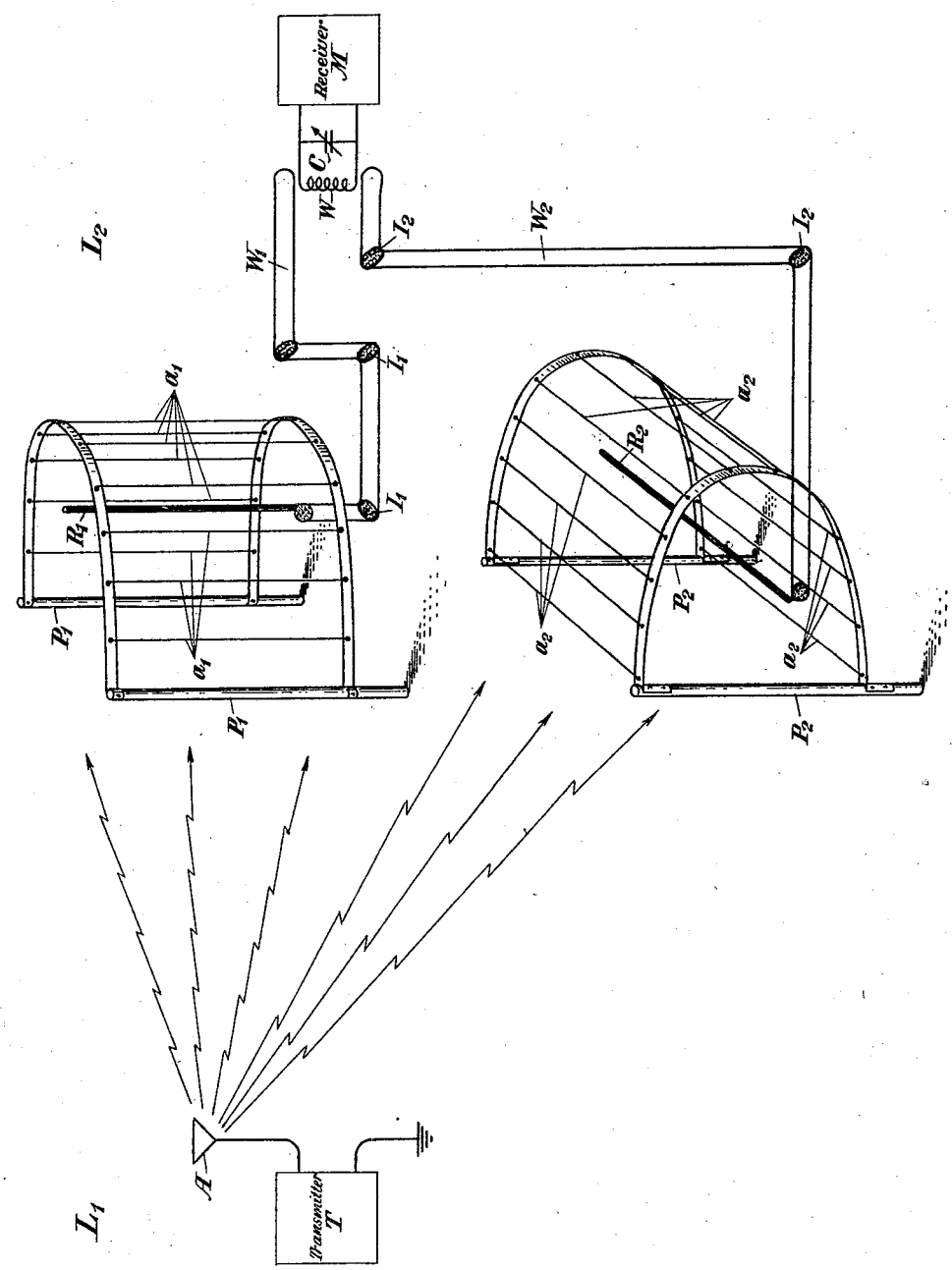
INVENTOR.
R. S. Ohl
BY
ATTORNEY Patented May 19, 1931

1,805,591

UNITED STATES PATENT OFFICE

RUSSELL S. OHL, OF NEW YORK, N. Y., ASSIGNOR TO AMERICAN TELEPHONE AND TELEGRAPH COMPANY, A CORPORATION OF NEW YORK

SIGNALING SYSTEM

Application filed December 18, 1926. Serial No. 155,726.

This invention relates to signaling systems, and particularly to arrangements for separately receiving first one component of transmitted signals and then another component of the transmitted signals polarized, preferably, in a different plane so that the received components may be combined in proper phase relationship in order that the signaling currents may be reproduced.

When radio signals originating at a transmitting station are transmitted through space to a receiving station, a considerable distance away, it has been found that these radio waves have traversed the distance from the transmitting station to the receiving station usually by some indirect path and that the waves have apparently traveled to some point in the upper atmosphere and have been returned to the earth as though reflected by some reflecting layer. When these radio waves reach the earth, it is found that they may be polarized at any angle whatsoever with respect to the surface of the earth, usually different from, though occasionally the same as, the angle with the surface of the earth at which they were transmitted. If, therefore, the waves carrying the signals are received by an antenna structure which can pick up waves polarized, for example, vertically, then whenever the vertically polarized component is absent, as is sometimes the case, the waves carrying the signals will be received by the antenna structure with exceedingly low, if not negligible, amplitude. Yet, if two antenna structures are used at the receiving station, one of which is polarized horizontally while the other is polarized vertically, i. e., one arranged so as to receive horizontally polarized waves with high efficiency and the other arranged so as to receive vertically polarized waves with equally high efficiency, and if the two antenna structures are so related to a transmission line and to a radio receiver that the components of the radio waves received by these structures are suitably combined in the proper phase relationship, the signals carried by the radio waves will be received with exceedingly high efficiency, whatever may have been the angle of polarization of the signals with respect to the surface of the earth at the transmitting station. The effect of the atmosphere in decreasing the amplitude of radio waves transmitted therethrough is often called "fading".

Accordingly, it is one of the principal objects of this invention to overcome the effects of "fading" introduced by the atmosphere by so relating two or more antenna structures to each other that these antenna structures may pick up different components of the transmitted waves carrying the signals, which components may be suitably combined in proper phase relationship and then impressed upon a radio receiver so that the signals may be reproduced. This object may be attained by placing the antenna structures at the receiving station at a predetermined angle with respect to each other and at a certain relative distance from each other and by so connecting the antenna structures to the receiving apparatus that the components of the radio waves received by the respective antenna structures will be in proper phase relationship.

While this invention will be pointed out with particularity in the appended claims, the invention, itself, both as to its further objects and features will be better understood from the detailed description hereinafter following, when read in connection with the accompanying drawing showing one particular embodiment of the invention merely for the purpose of illustration.

Referring to the drawing, two stations are shown, a transmitting station $L_1$ and a receiving station $L_2$. The transmitting station comprises a transmitter T which may be any form of transmitter well known in the art, preferably one transmitting high frequency electrical waves with suitable modulations of signaling current. The transmitter T is connected to an antenna A and ground so that the generated radio frequency waves carrying the signals may be radiated through space.

At the receiving station $L_2$, there are two antenna structures, one of which is preferably located with its axis vertical and the other of which is preferably located with its axis horizontal. The vertical antenna structure is near the horizontal antenna structure. The vertical antenna structure comprises preferably a parabolic array consisting of a plurality of elements $a_1$, all arranged on a parabolic surface around an aerial $R_1$, often called a resonator, as a focus. The horizontal antenna structure comprises a parabolic array also consisting of a plurality of elements $a_2$, all arranged on a parabolic surface around a resonator $R_2$ as a focus. The vertical antenna array is supported by posts $P_1$ which elevate the antenna structure a definite distance above the surface of the earth. The horizontal antenna structure is supported by posts $P_2$ which also elevate this antenna structure above the surface of the earth at some definite distance. It will be obvious that these parabolic antenna structures are employed herein particularly for their directive properties in order to increase the received signal strength. Yet, any other antenna structures or arrays might equally well be employed herein within the scope of this invention.

A transmission line $W_1$ transfers the energy received by the vertical antenna structure to a winding W, while another transmission line $W_2$ of the same general character transfers the energy received by the horizontal antenna structure to the winding W. These transmission lines $W_1$ and $W_2$ bring the received energy into inductive relation with the field of the winding W. Each of these transmission lines consists preferably of two parallel wires almost equally spaced throughout, one end of each of which is connected to a resonator and the other end of each of which is open, though terminating preferably where the transmission line begins. Insulators $I_1$ and $I_2$ maintain the distances between the conductors of transmission lines $W_1$ and $W_2$, respectively, constant, although it will be understood that it is not essential to this invention to maintain these conductors equally spaced throughout. Any other form of transmission line, such as a single conductor contained in a metallic tube, insulated by a dielectric such as air, may obviously be employed herein.

A condenser C, preferably a variable condenser, as shown, is connected across the terminals of the winding W, thereby providing a circuit tuned to the frequency of the radio waves to be received by the system. These radio waves are then impressed upon a receiver M, from which the signals may be derived and, if desired, amplified to any desirable energy level.

Radio waves that are transmitted through space, which are vertically polarized, are received by the vertical antenna structure, while radio waves which are horizontally polarized are received by the horizontal antenna structure. If a radio wave is transmitted, the vertical component of which is absent for a short time due, for example, to the conditions of the transmitting medium, and if there is a horizontal component present, that component will be received by the horizontal antenna structure and transmitted over the corresponding transmission line to the receiver where the signals will be reproduced. And, conversely, if the horizontal component of a radio wave, or waves, is absent for any reason whatsoever, the vertical antenna structure will pick up the vertical component of the radio wave, or waves, and transmit that component over the corresponding transmission line to the receiver M, where again the signals may be reproduced. Moreover, if both the vertical and horizontal components of transmitted waves are present at the receiving station, both antenna structures will become energized, the vertical component being transmitted over the transmission line $W_1$, the horizontal component being transmitted over the transmission line $W_2$, both components being combined in proper phase relationship so that the signals may be reproduced by the receiver M.

To render the reception of radio waves at a receiving station even more efficient, it is necessary to elevate the antenna structures above the earth at a considerable distance, preferably a distance of several wave lengths. It is an established fact that the field strength at the receiving station increases considerably with elevation of the antenna structure above the surface of the earth. This is especially so for currents of very high frequencies.

The resonators $R_1$ and $R_2$ are located in the focal lines of the vertical and horizontal antenna arrays, respectively. One end of the transmission line $W_1$ is connected to the resonator $R_1$ and one end of the transmission line $W_2$ is connected to the resonator $R_2$. The antenna elements of each parabolic array may be of any length whatsoever, preferably, a definite fraction of the wave length of the current to be received, such, for example, as half a wave length. If it be assumed for illustration that the resonator is a half wave length long, then the total length of the transmission line should preferably be a multiple of a quarter wave length, plus a multiple of a half wave length. In other words, if the resonator is a half wave length long, the distance from the beginning of the transmission line to the winding W, as well as the distance from the open end of the transmission line to the winding W, should be either 1/4, 3/4, 5/4, . . ., of a wave length, or, in general, any odd multiple of one-quarter of a wave length.

If these conditions are carefully observed, the components of the transmitted waves will be received by the antenna structures and transmitted to the receiver with great efficiency and in the proper phase relationship.

This invention is intended to overcome the effect known as "fading" introduced by a transmission medium such as the atmosphere, which substantially attenuates one of the components of the transmitted signals such, for example, as the vertical component, more than other components. In the embodiment of this invention shown merely for the purpose of illustration two antenna structures are employed, vertical and horizontal structures, respectively, the fields of which are united in proper phase relationship so that the signals may be reproduced. Yet this invention is not to be limited to a combination of two antenna structures at a definite angle to each other, as it is obvious that more than two antenna structures, parabolic antenna arrays or other antenna arrays, may be employed herein without departing from the spirit of the invention.

While this invention has been shown and described in a certain particular embodiment merely for the purpose of illustration, it is to be distinctly understood that the general principles of this invention may be applied to other and widely varied organizations without departing from the spirit of the invention and the scope of the appended claims.

What is claimed is:

1. The combination of a pair of antenna arrays located about the surfaces of two cylindrical parabolas which make a predetermined angle with one another, respectively, and means for rendering said antenna arrays receptive to components of transmitted signals making corresponding angles with one another without regard to the angle of polarization of said transmitted signals.

2. The combination of means for generating and transmitting signals, and means for receiving the transmitted signals by receiving two components thereof including a parabolic antenna array of a plurality of conductors for receiving one of the components of the transmitted signals, and a parabolic antenna array of a similar plurality of conductors for receiving another component of the transmitted signals, the axes of said parabolic antenna arrays being displaced from each other by a predetermined angle.

3. The combination of means for generating and transmitting signals, and means for receiving the transmitted signals by independently receiving two components thereof including a parabolic antenna array of a plurality of conductors for receiving one component of the transmitted signals, a parabolic antenna array of a similar plurality of conductors for receiving another and entirely different component of the transmitted signals, said parabolic antenna arrays being displaced from each other by a predetermined angle, and means for combining the received components of said signals to reproduce said signals.

4. The combination of means for generating signals of definite frequency, means for transmitting said signals through space, a pair of parabolic antenna arrays at right angles to each other to receive respectively perpendicular components of the transmitted signals, and means to combine only the two received components of the transmitted signals in the proper phase relationship in order that said signals may be reproduced.

5. The combination of a generator of electrical energy which, when transmitted through space, becomes polarized at various angles with respect to the surface of the earth, an antenna structure of a plurality of conductors arranged about the surface of a cylindrical parabola for receiving the vertically polarized component of said energy, another antenna structure of a similar plurality of conductors also arranged about the surface of a cylindrical parabola for receiving the horizontally polarized component of said energy, said antenna structure being substantially at right angles to each other, and means for combining said vertically polarized component and said horizontally polarized component in a predetermined phase relationship.

6. In a receiving system for receiving modulated high frequency signals regardless of the direction of their source, in combination, a pair of antenna arrays located about the surfaces of two cylindrical parabolas which are mutually perpendicular, mutually perpendicular components of the modulated high frequency signals being respectively impressed on said antenna arrays, and means for combining said two components of said signals to the exclusion of all other components to reproduce said signals.

In testimony whereof, I have signed my name to this specification this 17th day of December 1926.

RUSSELL S. OHL.